April 8, 1958  A. W. KROGMAN  2,829,775
FILTERING AND COOLING STRUCTURE
Filed Nov. 23, 1954  3 Sheets-Sheet 1

INVENTOR
A. W. KROGMAN
BY
Alan C. Rose
ATTORNEY

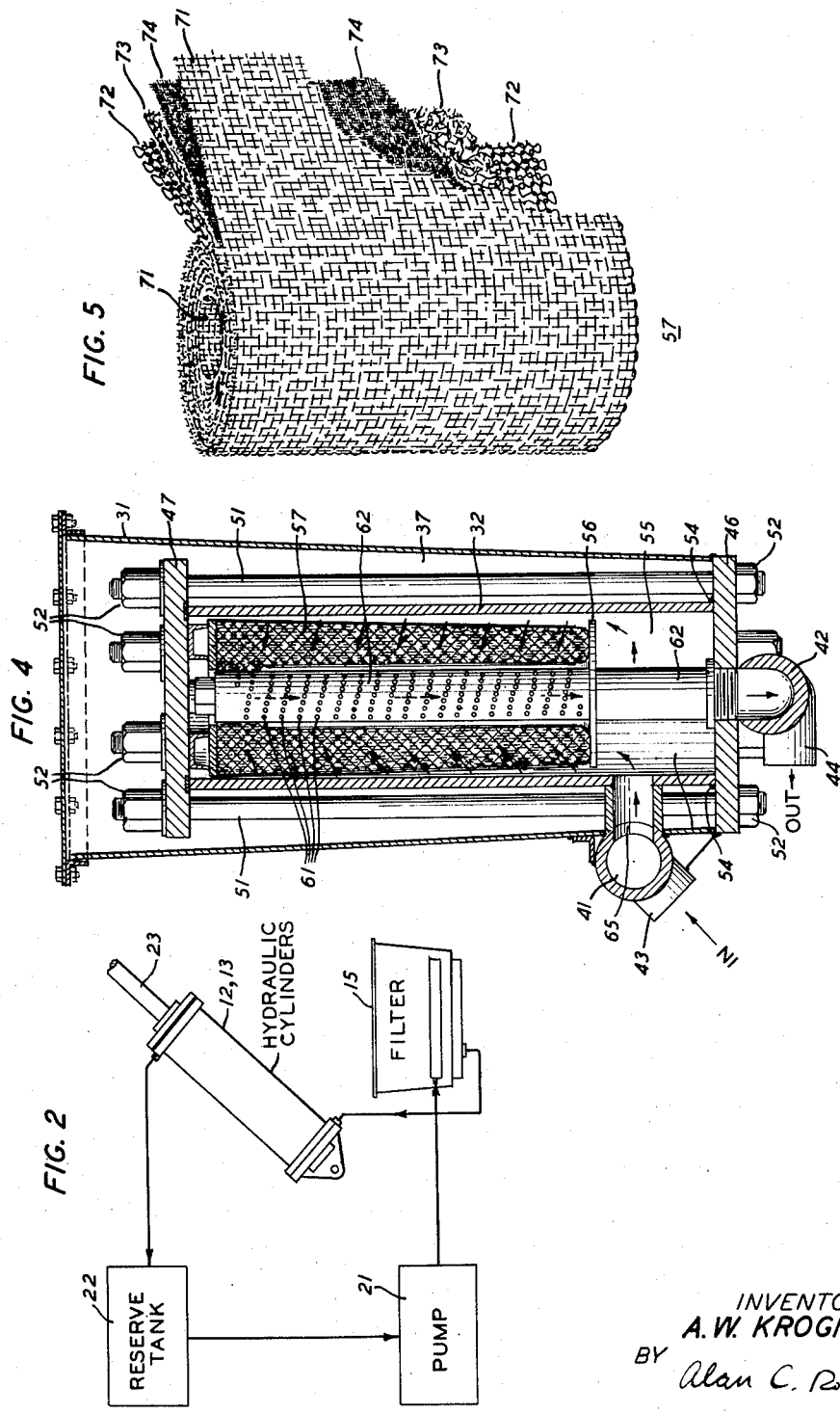

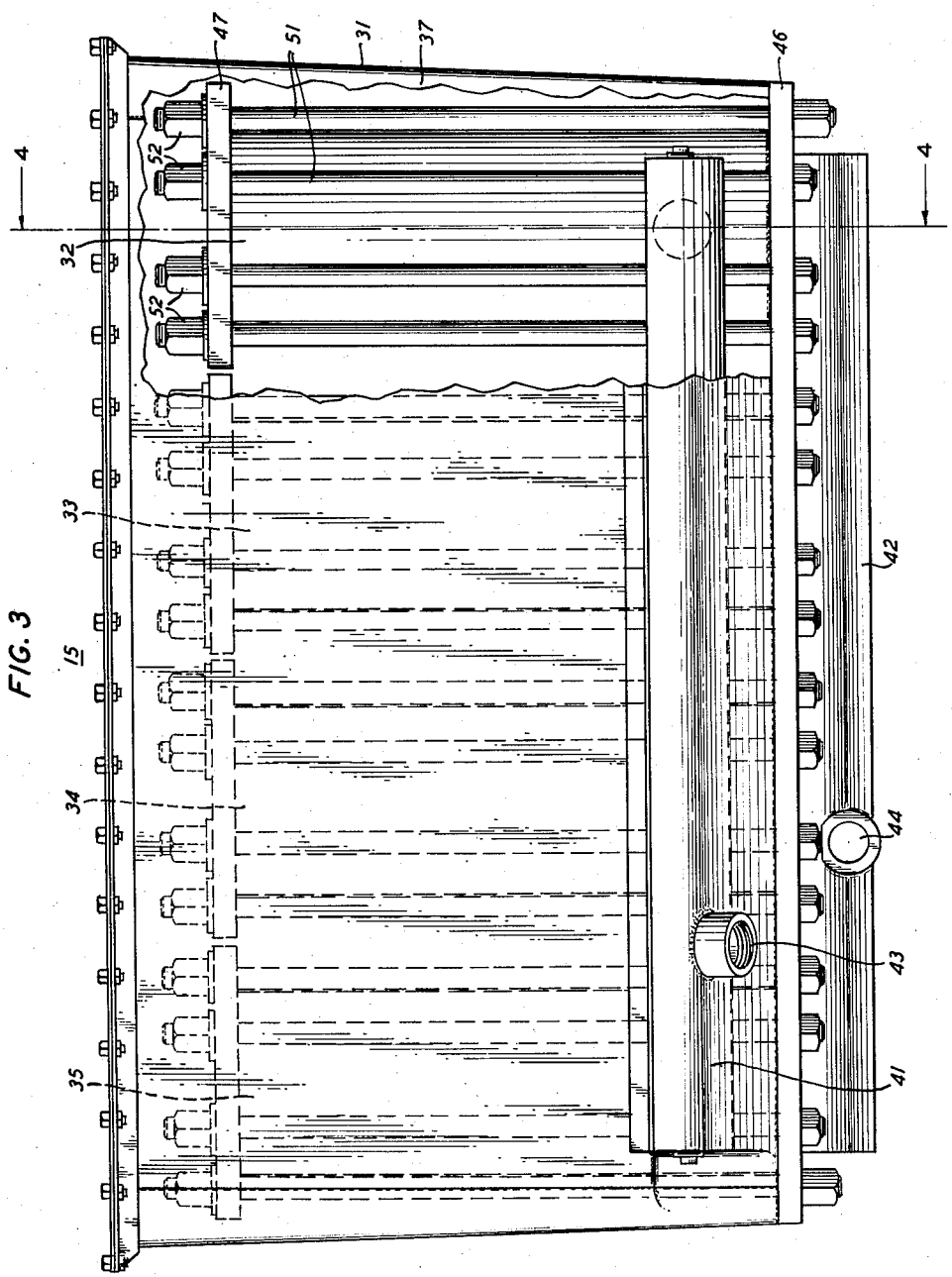

United States Patent Office 2,829,775
Patented Apr. 8, 1958

2,829,775

FILTERING AND COOLING STRUCTURE

Alfred W. Krogman, Long Branch, N. J.

Application November 23, 1954, Serial No. 470,584

3 Claims. (Cl. 210—186)

This invention relates to filters for use at high pressures.

Heavy duty hydraulic systems, such as those used in earth moving equipment, break down often. One reason for these failures is the high pressure at which the systems operated. This pressure may run from 500 pounds per square inch to over 5,000 pounds per square inch. When the hydraulic equipment is driven hard, the oil in the hydraulic system heats up. Under high temperature and pressure, the oil starts to break down, or decompose, and gases may be given off. Dirt from the dust-filled atmosphere surrounding the earth moving equipment also finds its way into the hydraulic system at pressure release vent points and other openings in the system. With gas and solid decomposition products as well as dust and dirt from the air in the hydraulic system, it no longer works properly, and operators find that the machines must be shut down before they break down.

The principal object of the present invention is to filter and cool oil under high pressure.

In hydraulic systems, it is important that all of the oil flows through the filter. Otherwise a single hard foreign body circulating in the hydraulic system could bypass the filter and seriously damage the pump or some other expensive unit in the system. Unlike the bypass filters used in automobiles, for example, full flow filters should have little or no back pressure. The back pressure, or pressure across the filter unit required to force oil through it, is wasted pressure. Thus, in one hydraulic system which was actually used for several months, the pump produced pressure of 1800 pounds per square inch, and 250 pounds per square inch were required to force oil through the filter. This left the hydraulic equipment underpowered, with only 1550 pounds per square inch remaining for its operation.

Accordingly, a collateral object of the present invention is to reduce the back pressure in high pressure full flow filters.

In accordance with one aspect of the invention, oil is filtered and cooled in a full flow filter which is made up of a plurality of filter units in parallel with each other, all of which are enclosed in a water jacket. Another aspect of the invention involves the use of a crimp knit wire cloth in the filter element to substantially eliminate the back pressure of the filter units.

The use of a number of filter units in parallel instead of one large filter unit in the present filter structure yields a number of important advantages. These advantages include an additional factor in the prevention of back pressure, increasing the effective cooling area between the filter units and the water jacket, reducing the thickness of the entire filter structure so that it may readily be mounted on earth moving equipment, and reducing the probability of clogging the filter structure.

Other objects and advantages, and various features of the invention will become apparent in the course of the following detailed description taken in conjunction with the appended claims and accompanying drawings forming a part thereof. In the drawings, Fig. 1 illustrates a type of earth moving equipment termed a "loader," having a filter in accordance with the invention mounted thereon;

Fig. 2 is a schematic diagram of the hydraulic system of the loader of Fig. 1;

Fig. 3 is a cut-away view of the filter structure in accordance with the invention;

Fig. 4 is a cross-section through the filter structure taken along line 4—4 of Fig. 3 through the center of one of the filter units; and Fig. 5 is a view of a partially unrolled filtering element.

Figure 1:
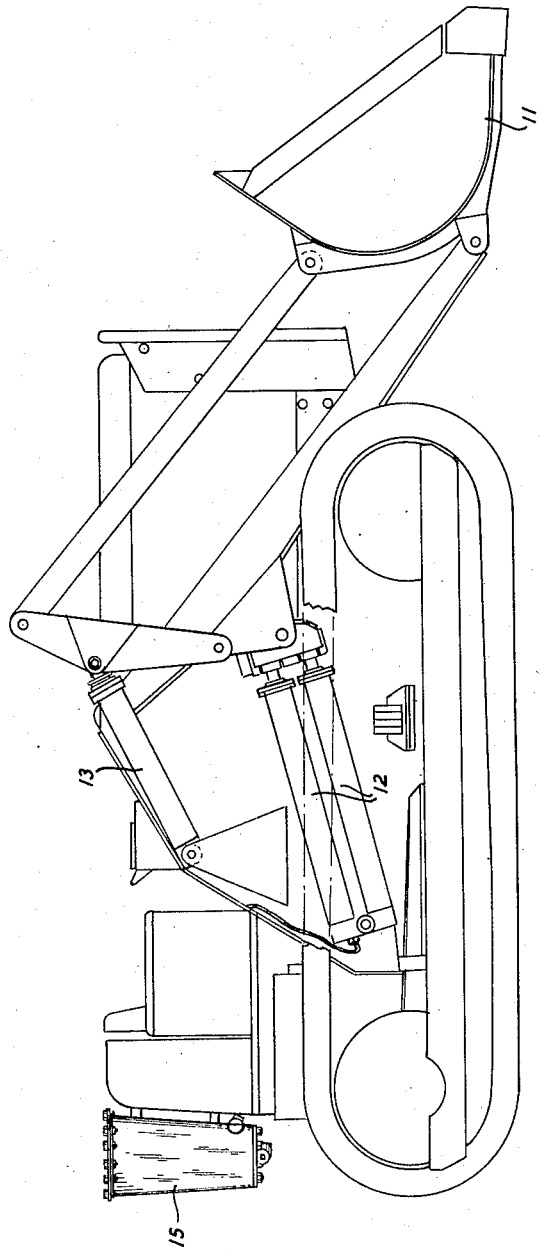

Fig. 1 shows a "loader," which is one of the well known types of earth moving equipment. In operation, the scoop 11 is lowered as shown in Fig. 1 and is filled by the forward movement of the vehicle. After the scoop is filled it is raised by the hydraulic lift cylinders 12. The hydraulic dump cylinder 13 tilts the scoop 11 and dumps the earth into a waiting truck. The scoop used on some of the larger loaders has a six cubic yard capacity and can fill the standard dump truck with a single scoopful of earth.

When the earth is raised, the hydraulic fluid in the lift cylinder 12 is subjected to terrific pressure; and this pressure is abruptly released as the earth is dumped. In the steady operation of the loader, this repeated cycle of pressure variations raises the temperature of the hydraulic fluid rapidly. When the temperature of the hydraulic system reaches about 250 or 260 degrees Fahrenheit, gases form in the hydraulic system. When this occurs the action of the hydraulic system becomes "spongy" and undependable, and the equipment must be shut down. In the summertime, at the height of the construction season, the heat of the sun adds to that generated within the hydraulic system and that generated by the internal combustion engine of the loader. Under these circumstances I have seen loaders overheated before noon, and remain out of commission for most of the rest of the day.

However, with the hydraulic fluid passing through my filtering and cooling unit 15, shown mounted behind the driver's seat in Fig. 1, the temperature of the oil has never exceeded 165 degrees Fahrenheit, even on the hottest days of the summer. In addition, in the course of several months of continuous operation there has not been a single breakdown in the hydraulic system. This compares with the mechanical breakdowns which occurred practically every day during the summer in which continuous operation was attempted, prior to the installation of my filtering and cooling structure. For example, during a period of less than one month, two hydraulic pumps were burned out, the hydraulic cylinders were severely damaged, and there was much additional damage to the hydraulic system. This cost thousands of dollars for repair costs and resulted in the equipment being out of commission for at least two-thirds of the one month period.

Fig. 2 is a schematic diagram of the hydraulic system of the loader of Fig. 1. It illustrates the series arrangement of the pump 21, the hydraulic cylinders 12, 13, the filter 15 and the low pressure reserve tank 22. The reserve tank is provided with a vent (not shown); and it is through such openings as the vent of the reserve tank and along the piston linkage 23 of the hydraulic cylinders that dirt enters the hydraulic system.

Fig. 3 shows, by way of example and for purposes of illustration, a cut-away view of an oil filter structure in accordance with the invention. The outer cooling jacket 31 of the filter structure encloses several filter units. In the present illustrative example, four aligned cylindrical filter units 32, 33, 34 and 35 are employed. In operation, the space 37 between the outer casing and the filter units is filled with water for cooling purposes. The hydraulic fluid is applied to the four units in parallel by means of the intake and outlet manifolds 41 and 42, respectively. Thus, hydraulic fluid is supplied to the filter at inlet 43 to the intake manifold 41 and leaves the filter at the fitting 44 in the output manifold 42. The four filter units 32 through 35 have a common mounting or base plate 46. This heavy base plate forms the bottom wall of each of the filter units and of the water jacket. Each filter unit is provided with a separate upper sealing plate 47.

Fig. 4 is a cross sectional view taken along line 4—4 of Fig. 3 through the center of filter unit 32. As may be more readily observed in Fig. 4, the upper sealing plate 47 is held securely in position and to the base plate 46 by the studs 51 and nuts 52. The cylindrical filter unit casing 32 is welded to the base plate 46 at 54.

The operation of one individual filter unit is indicated by the arrows indicating the direction of hydraulic fluid flow in Fig. 4. Hydraulic fluid from the intake manifold 41 first enters the cylindrical sedimentation space 55 at the bottom of the filter unit. Heavy foreign particles settle out of the fluid in this sedimentation space 55. The fluid then passes around the outer periphery of the filter element retaining washer 56 and through the special filter element 57. The lower portion of the filter element 57 is shown slightly tapered to permit free passage of the fluid to the upper portion of the outer surface of the filter element. However, with adequate space between the filter element 57 and the inner surface of the filter unit casing 32, the taper is unnecessary and the filter element may be cylindrical.

While the fluid is in the sedimentation space, and as it circulates upward against the outer wall 32 of the filter unit, the hot fluid is cooled down rapidly. The heat is transferred from the fluid through the wall 32 to the water in the water jacket 37.

The cylindrical filter element 57 is made up of successive layers of different filter materials wound up in a spiral manner as will be explained in greater detail in connection with Fig. 5. Accordingly, when the hydraulic fluid passes inwardly toward the many apertures 61 in the central standpipe 62, it flows perpendicular to the layers of filtering material.

To facilitate the free flow of fluid through the filter unit, the total area of the holes 61 is substantially greater than the inner cross-sectional area of the standpipe 62. The standpipe 61 has no holes below the washer 56, in the region where the standpipe passes through the sedimentation space. Accordingly, with the washer 56 secured to the standpipe 62, none of the hydraulic fluid can bypass the filter element 57.

After passing through the filter element 57 and the fine holes 61 in the upper portion of the standpipe 62, the hydraulic fluid flows down through the standpipe into the outlet manifold 42. The other filter units are all similar in construction to the unit 32 which is shown in cross-section in Fig. 4. The oil in the input manifold 41 therefore divides into the several filter units 32 through 35, passes through them in parallel, and is recombined in the output manifold 42.

As mentioned hereinabove, the present filter structure is a true full flow filter. All of the hydraulic fluid passes through the filter each time it passes through the series hydraulic circuit including the pump and the hydraulic cylinders. In a full flow filter, it is important to substantially eliminate the resistance to fluid flow in the filter. The four separate parallel paths through the present filter structure help to accomplish this purpose. They offer practically no resistance to fluid flow, in comparison with the resistance which a single large filter unit having a capacity equal to that of the four smaller units would present.

As compared with a single large cylindrical element, the four smaller units also provide greatly improved heat transfer properties. For example, the relative heat dissipating properties of a single large element will be compared with that of four small elements having the same capacity, or volume of filtering material, as the large filter unit. As a rough measure of the heat dissipating properties, the relative area outer cylindrical surfaces of the filter elements will be compared. Inasmuch as this is the principal region of heat transfer to the water jacket, this ratio gives a good indication of the relative heat dissipation properties. Taking the radius of the large filter unit as R and that of one of the four smaller units as $r$, and assuming that the filter units have the same length, $$R = 2r$$

for the large unit to have the same volume of filter material as the four small units. This results from the fact that the volumes are proportional to the square of the radii. The outer surfaces of the filter elements will be proportional to the circumference of the filters. The circumference of the large filter unit $$C = 2\pi R = 4\pi r$$

The circumference of one of the smaller filter units $$c = 2\pi r$$

The total circumferential distance of the four small units is $$4c = 8\pi r$$

With the heat dissipation being roughly proportional to the relative circumferential values developed above, it is clear that the cooling properties of the four small units are about twice as good as that of the single large unit.

The parallel arrangements of filter units also help avoid clogging which might otherwise occur at the input or output to the filter units. Thus, for example, if a foreign object clogged the passageway 65 at the entrance of one of the filter units, the fluid would be diverted to the other three filter units. Thus, instead of blocking the entire filter and the hydraulic system, only one of the four filtering units would be temporarily blocked; and this would be corrected at the next regular servicing of the filter.

To adequately protect against contingencies such as that mentioned in the preceding paragraph, the filter is designed to have a capacity which is four times that which would actually be required for filtering purposes under normal operating conditions. This also serves to slow down the flow of fluid through the filter units, and greatly increases the transfer of heat to the enclosing water jacket.

The parallel construction of the filter unit in which several small aligned filter units are used, also produces a generally rectangular filter structure which is convenient for mounting on a vehicle. Whereas a single large filter unit would have a bulky round or square cross-section which would scarcely permit mounting the filter on a vehicle, the flat rectangular shape of the present filter makes it easy to mount on most earth moving equipment. Note, for example, Fig. 1 in which the present filter structure 15 is conveniently mounted directly behind the operator's seat.

Periodically, the filter units 57 must be removed and replaced. This is accomplished by removing the units 52 from the studs 51 and then removing the plate 47. This releases pressure from the filter unit 57 and the "floating" standpipe 62. After the filter element is removed the floating standpipe is loose, and may be removed and cleaned before replacing.

In Fig. 5 the filter element is shown partially unrolled. The filter element is constructed by winding layers of various materials on a mandrel, which may, for example, be rotated in a lathe. The center of the filter element has several layers of wire mesh 71 to give the element greater rigidity. Then the crimp knit wire cloth 72 is rolled into the assembly with the wire mesh. After a few more turns, the ixtle fibre 73 and cheese cloth 74 are also interleaved and wound into the filter unit. Thus, the fine filtering material consisting of the cheese cloth and the ixtle fibre is located toward the outer portion of the filter element. This fine filtering material which would normally offer the greatest resistance to fluid pressure is located where the surface area for the oil to pass through is greatest, and thus avoids the introduction of any substantial back pressure.

The use of the crimp knit wire cloth is important in obtaining a filter element having substantially no back pressure. The open nature of this crimped wire prevents clogging of the filter element and permits free flow of the hydraulic fluid.

The ixtle fibre 73 and the cheese cloth 74 perform the important function of filtering the fine material such as the dust and dirt which gets into the hydraulic fluid. The ixtle fibre is not to be confused with the related sisal fibre. Whereas sisal fibre becomes relatively limp and loses much of its filtering qualities when soaked in fluid, ixtle retains its resiliency and its filtering qualities despite soaking. Ixtle fibre has also been termed "Tula" fibre or "White Tampico" fibre.

Proceeding to a more detailed specification of the filter element, its size is as follows:

|  | Inches |
| --- | --- |
| Inner diameter | 2½ |
| Outer diameter | 7 |
| Height | 16½ |

The amount and kind of the materials used in making the filter element are as follows:

| Number 10 wire mesh | feet | 15 |
| --- | --- | --- |
| Crimp knit wire mesh (wire diameter 0.011 inch, distance between crimps is ¼ inch and depth of crimp is ¼ inch) | feet | 8½ |
| Ixtle fibre (curled and picked) | ounces | 2½ |
| Cheese cloth | feet | 6 |

While the foregoing specifications are preferred, the exact specifications are merely illustrative and are not to be construed as limitations of the invention. For example, the overall size of the element may depend on the required capacity of the entire filter unit, and the specification of the wire mesh, crimp knit wire, etc., depends on factors such as the viscosity of the oil which is to be filtered. Thus, the specifications of the filter unit set forth above were for wire for hydraulic oil having a viscosity of approximately SAE 10 or 20, and the capacity of the entire filter unit was 90 gallons per minute.

As mentioned above, Fig. 5 illustrates the filter element after it has been partly unrolled. In addition, the various layers are shown as being of equal length for convenience of illustrations. In the actual filter unit, the strip of wire mesh would be considerably longer than the other elements and would be wrapped around the outer surface of the unit to give it greater rigidity. The end of the wire mesh layer is folded under and stapled to the filter unit to complete the outer surface of the cylindrical filter element.

As a result of the use of the filter element detailed above which has negligible resistance to fluid flow, and the use of the parallel filter unit arrangement, the overall filter structure was found to have practically no back pressure. Specifically, in operation on one particular unit of earth moving equipment, the lowest back pressure which had previously been obtained in testing several other filters was over one hundred pounds per square inch. The present filter structure, however, was found to have less than six pounds back pressure.

It is to be understood that the above-described arrangements are illustrative of the principles of the invention. Numerous other arrangements may be devised by those skilled in the art without departing from the spirit and scope of the invention. By way of example but not of limitation, the filter structure could be made up of a greater or lesser number of filter units than the four units shown in the present drawings. Furthermore, while the present filtering and cooling structure has been disclosed primarily for use in the hydraulic systems of earth moving equipment, it is also applicable to other heavy duty hydraulic systems which are operated at high pressures or under comparable adverse conditions.

What is claimed is:

1. In a full-flow filter structure for use in a heavy duty hydraulic system, a heavy generally rectangular base plate, a substantially rectangular cooling jacket mounted on said base plate; a plurality of substantially aligned cylindrical filter unit casings mounted in said cooling jacket and having said base plate as one end closure; individual plates forming the other end closure for said casings, means for securing said plates and filtering casings securely to said base plate; each filter unit including a sedimentation space, a central floating standpipe having many small perforations through the upper portion of its surface, the lower imperforate portion of said standpipe passing through said sedimentation space, a washer mounted on said standpipe between upper perforate portion and said lower imperforate portion, a generally cylindrical filter element having a coaxial cylindrical channel therethrough mounted on said upper portion of said standpipe, the lower end of said filter element being in contact with said washer, said filter element being made up of a plurality of spirally wound layers of wire mesh and additional fine filtering material, said filter unit casings including an inlet opening into said sedimentation space below said washer, and means for applying the fluid to be filtered to said sedimentation space and for forcing the fluid radially through the filter element from the outer surface thereof perpendicular to the layers of filtering material inwardly to the perforated upper portion of said standpipe; and input and output manifolds for applying the fluid to be filtered to said filter unit casings in parallel.

2. In a full-flow filter structure for use in a heavy duty hydraulic system, a heavy elongated base plate, a cooling jacket mounted on said base plate; a plurality of substantially aligned cylindrical filter unit casings mounted in said cooling jacket and having said base plate as one end closure; individual plates forming the other end closure for said casings, means for securing said plates and filtering casings securely to said base plate; each filter unit including a sedimentation space, a central floating standpipe having many small perforations through the upper portion of its surface, the lower imperforate portion of said standpipe passing through said sedimentation space, a washer mounted on said standpipe between upper perforate portion and said lower imperforate portion, a generally cylindrical filter element having a coaxial cylindrical channel therethrough mounted on said upper portion of said standpipe, the lower end of said filter element being in contact with said washer, said filter element being made up of a plurality of spirally wound layers of wire mesh and additional fine filtering material, said filter unit casings including an inlet opening into said sedimentation space below said washer, and means for applying the fluid to be filtered to said sedimentation space and for forcing the fluid radially through the filter element from the outer surface thereof perpendicular to the layers of filtering material inwardly to the perforated upper portion of said standpipe; and input and output manifolds for applying the fluid to be filtered to said filter unit casings in parallel.

3. In a full-flow filter structure for use in a heavy duty hydraulic system, a heavy elongated base plate, a cooling jacket mounted on said base plate; a plurality of substantially aligned cylindrical filter unit casings mounted in said cooling jacket and having said base plate as one end closure; individual plates forming the other end closure for said casings, means for securing said plates and filtering casings securely to said base plate; each filter unit including a sedimentation space, a ecntral floating standpipe having many small perforations through the upper portion of its surface, the lower imperforate portion of said standpipe passing through said sedimentation space, a washer mounted on said standpipe between upper perforate portion and said lower imperforate portion, a generally cylindrical filter element having a coaxial cylindrical channel therethrough mounted on said upper portion of said standpipe, the lower end of said filter element being in contact with said washer, said filter unit casings including an inlet opening into said sedimentation space below said washer, and means for applying the fluid to be filtered to said sedimentation space and for forcing the fluid radially through the filter element from the outer surface thereof inwardly to the perforated upper portion of said standpipe; and input and output manifolds for applying the fluid to be filtered to said filter unit casings in parallel.

References Cited in the file of this patent

UNITED STATES PATENTS

| | | |
|---|---|---|
| 251,731 | Phelps | Jan. 3, 1882 |
| 457,008 | Oster | Aug. 4, 1891 |
| 664,572 | McDougall | Dec. 25, 1900 |
| 879,856 | Darnall | Feb. 25, 1908 |
| 980,832 | Pittelkow | Jan. 3, 1911 |
| 1,940,317 | McKinley | Dec. 19, 1933 |
| 2,300,849 | Tauch | Nov. 3, 1942 |
| 2,341,130 | Unsworth | Feb. 8, 1944 |
| 2,374,756 | Kisch et al. | May 1, 1945 |
| 2,375,345 | Burhans | May 8, 1945 |
| 2,388,636 | Harvuot | Nov. 6, 1945 |
| 2,390,494 | Briggs et al. | Dec. 11, 1945 |
| 2,401,039 | Bauer | May 28, 1946 |
| 2,432,475 | Griffith | Dec. 9, 1947 |
| 2,425,848 | Vawter | Aug. 19, 1947 |
| 2,468,862 | Briggs | May 3, 1949 |
| 2,599,734 | Winslow et al. | June 10, 1952 |
| 2,700,326 | Curtis | Jan. 25, 1955 |
| 2,732,950 | Keight et al. | Jan. 31, 1956 |

FOREIGN PATENTS

| | | |
|---|---|---|
| 15,012 | Great Britain | of 1885 |
| 446,445 | Great Britain | Apr. 20, 1936 |

OTHER REFERENCES

Webster's New International Dictionary, 2nd ed., 1940, pp. 1319 and 2349, Merriam Company, Springfield, Mass.